United States Patent [19]

Uno

[11] 4,014,511
[45] Mar. 29, 1977

[54] BUTTERFLY VALVE

[75] Inventor: Takayoshi Uno, Osaka, Japan

[73] Assignee: Tomoe Technical Research Company, Osaka, Japan

[22] Filed: Mar. 1, 1976

[21] Appl. No.: 662,446

[52] U.S. Cl. .......................... 251/306; 137/454.2; 251/152

[51] Int. Cl.² ....................................... F16K 1/226

[58] Field of Search ................. 251/305, 306, 152; 137/454.2

[56] References Cited

UNITED STATES PATENTS

| 3,100,500 | 8/1963 | Stillwagon | 251/306 |
|---|---|---|---|
| 3,143,132 | 8/1964 | Pangburn | 251/306 |
| 3,173,650 | 3/1965 | Cotterman et al. | 251/306 |
| 3,241,806 | 3/1966 | Snell, Jr. | 251/306 |
| 3,253,815 | 5/1966 | Stillwagon | 251/306 |
| 3,314,641 | 4/1967 | Overbaugh | 251/306 |
| 3,540,691 | 11/1970 | Snell, Jr. | 251/306 |
| 3,633,872 | 1/1972 | Wright | 251/306 |
| 3,727,883 | 4/1973 | Conners et al. | 251/306 |
| 3,904,173 | 9/1975 | Naylor | 251/306 |

Primary Examiner—William R. Cline
Assistant Examiner—H. Jay Spiegel

[57] ABSTRACT

A butterfly valve comprises a valve body, a valve seat, a valve stem, a valve member and sealing assemblies in which the central portion of a seat face of the valve seat is raised higher than both of its side portions and the diameter of the valve seat at the central raised portion is smaller than that of the valve member whereby a perfect seal can be achieved.

2 Claims, 6 Drawing Figures

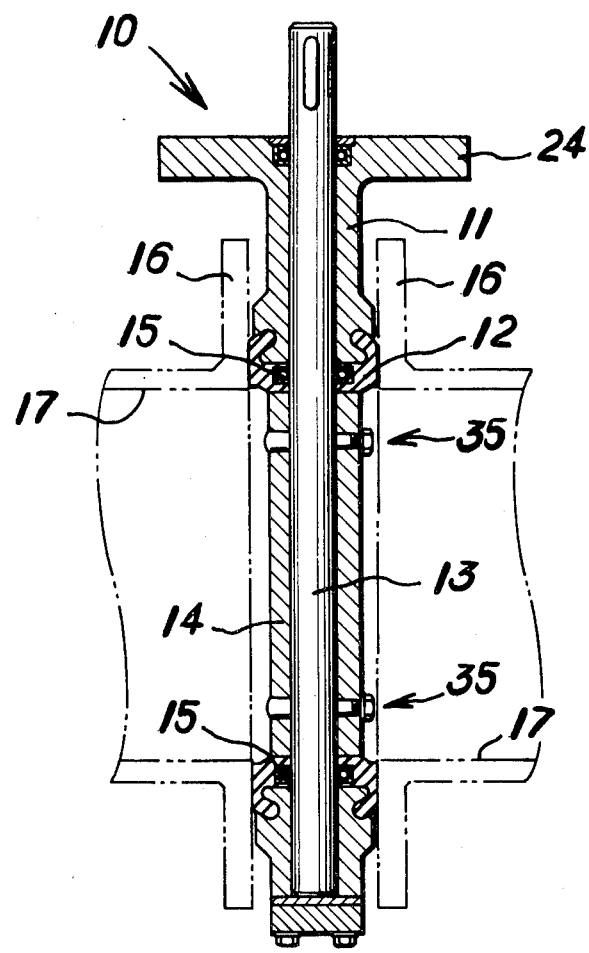
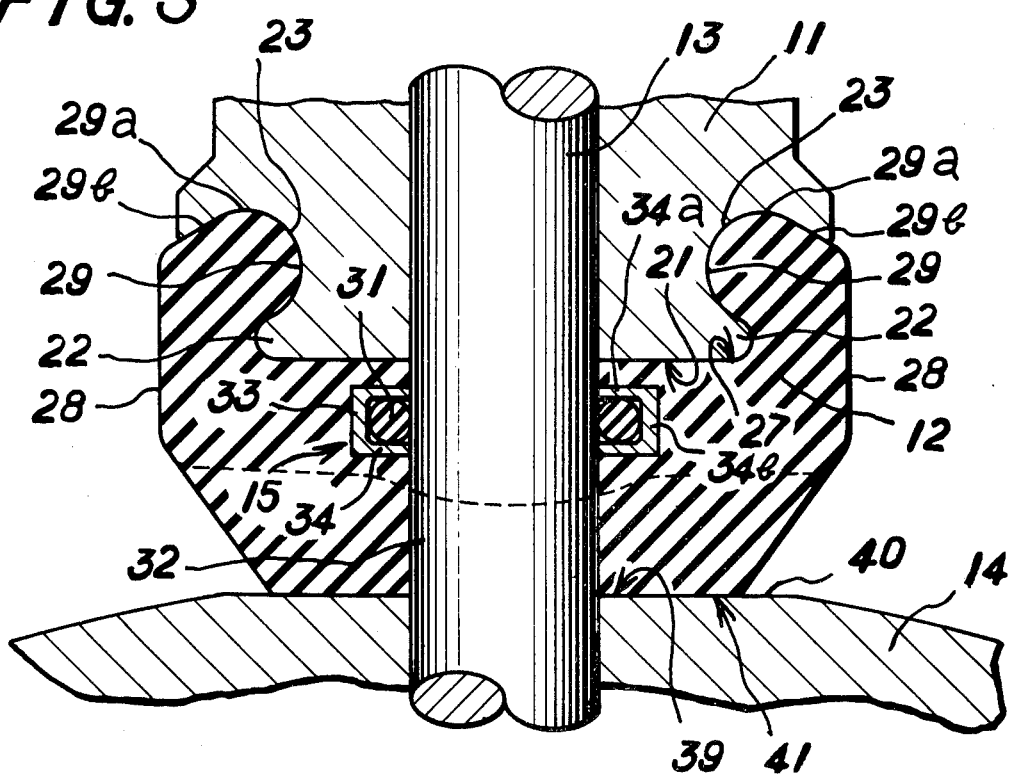

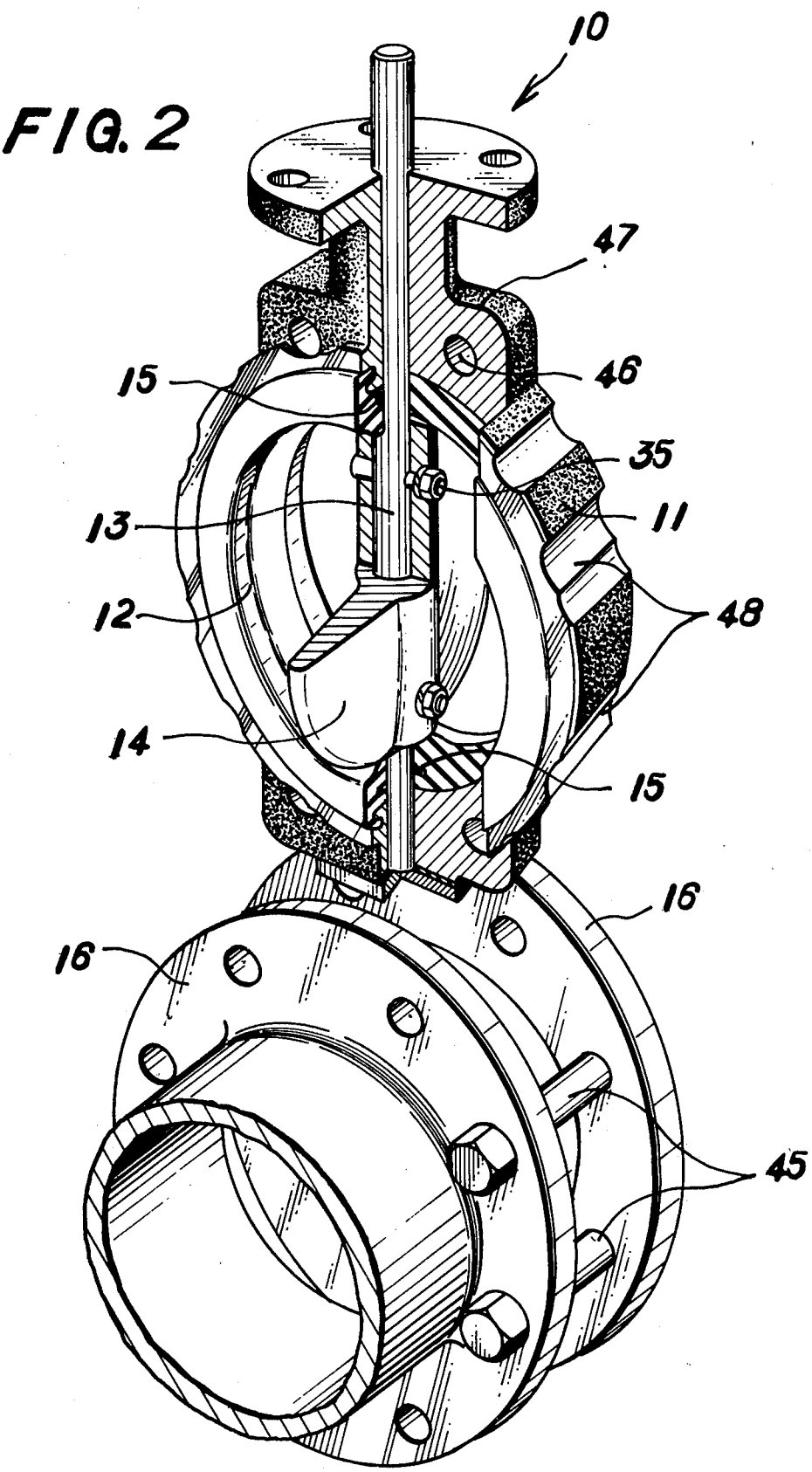

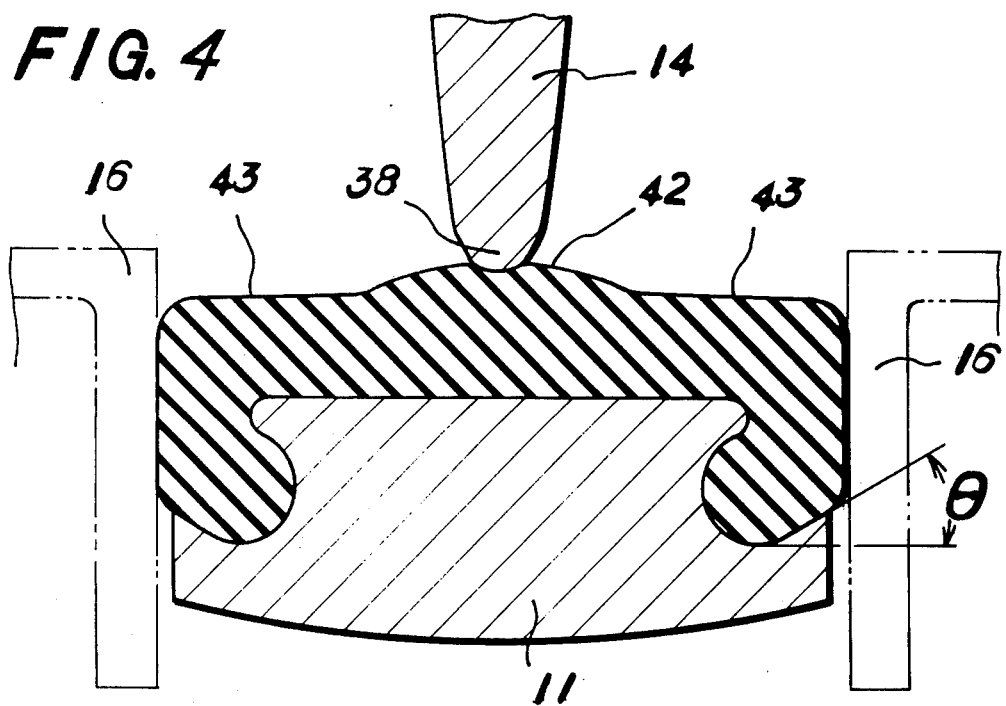
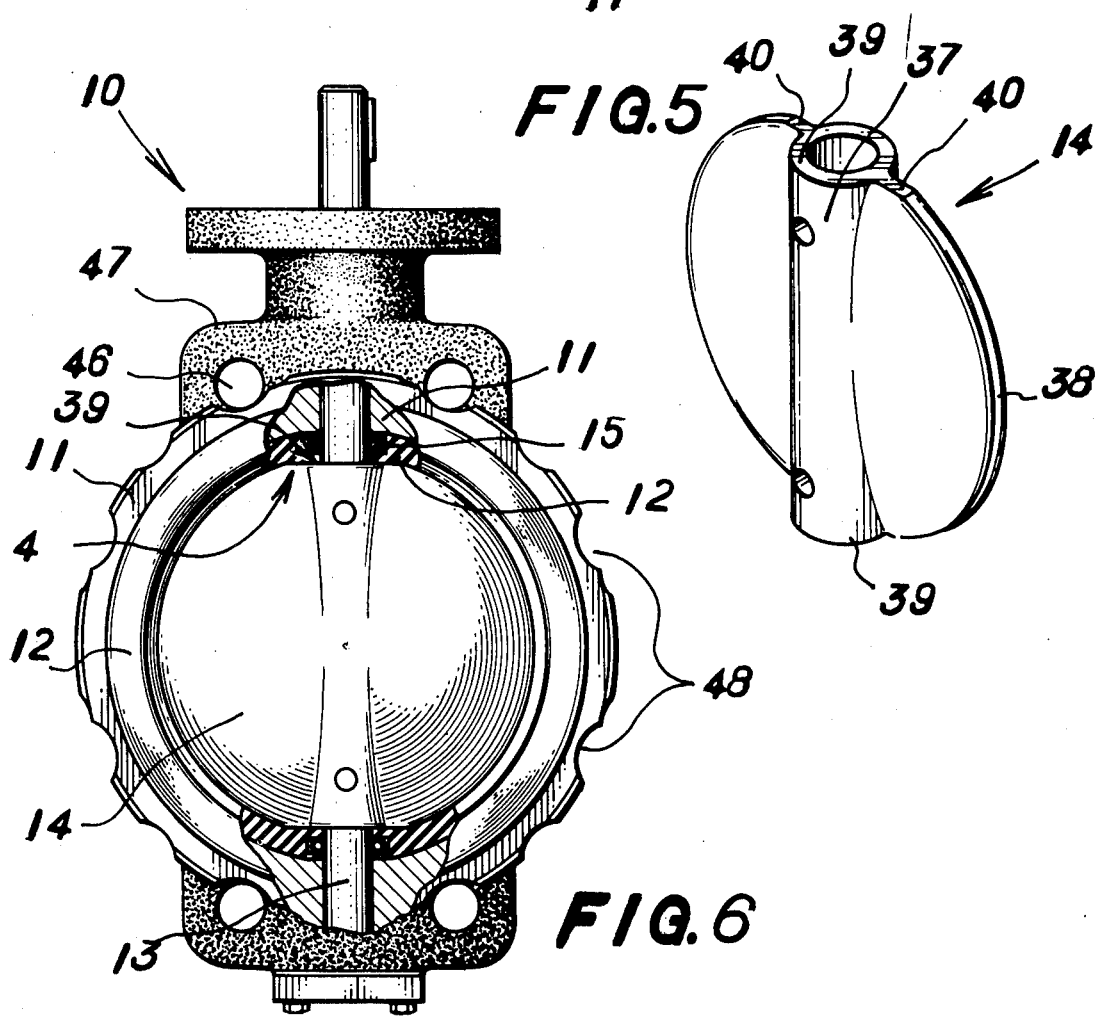

BUTTERFLY VALVE

The present invention relates to a butterfly valve in which a disk-like valve member rotates about a valve stem acting as a shaft.

The prior art to which the invention is directed includes the art of butterfly valves being of a type in which a usually circular vane or disc is rotatable in the valve passage between an open and a closed position. When in the closed position, a valve member engages with a valve seat to cooperate to provide a seal against leakage of the fluid in the pressurized line intended to be controlled by the valve. It is essential in valves of this type that the seal is effective on each occasion of valve closing throughout the life of the valve to continuously provide positive shut off without frequent maintenance and servicing of the seat. Since the seat is commonly subjected to wearing conditions by factors such as corrosion and temperature changes and the like, it is desirable to provide an ideal seat which is completely unaffected by these factors.

A valve stem is provided so as to pass through the valve seat and thus wearing is caused between the stem and the seat. Accordingly, it is desirable to provide a sealing assembly capable of sealing the fluid against leakage from between the valve stem and the valve seat.

Further, it is desirable to provide a valve seat which is adapted to be fitted onto the inner circumferental surface of a valve body, and to contact with tubular flange members with the valve being held between the tubular flange members, whereby the valve body and the tubular flange members in close contact with each other can provide a seal of the fluid against leakage.

An important object of the present invention is to provide a butterfly valve in which the central portion of a valve seat is formed in a raised shape, whereby a valve member in a closed position is resiliently urged at its peripheral edge by the raised portion of the seat.

Another important object of the present invention is to provide a butterfly valve in which an annular groove is provided in the inner circumferential surface of a hole provided in a valve seat through which the valve stem extends, and a sealing assembly comprising an annular holder and an O-ring adapted to be inserted inside the holder is placed in the groove.

A further important object of the present invention is to provide a butterfly valve in which a dovetail is provided in the inner circumferential surface of a valve body; a dovetail groove to correspond to the dovetail is formed in the outer circumferential surface of a valve seat, and each of two opposing faces of two annular projections so as to define the dovetail goove in the valve seat has a round shape while the outer circumferential surface of each projection is tapered with a larger diameter on the side of the opposing face.

A further object of the present invention is to provide a butterfly valve in which the end portion of the cylindrical portion of a valve member through which a valve stem extends define a plane extending to the periphery of the valve member, while a valve seat is formed in a shape as fits with the valve member.

Now, an embodiment of the present invention will be described with reference to the appended drawings, in which:

FIG. 1 is a longitudinal sectional view of a butterfly valve with the valve member in a position closing the flowway through a valve seat;

FIG. 2 is a partly sectional explanatory view of the valve body, the valve seat and the valve member of the valve of FIG. 1 moved from the space between the end faces of the tubular flange members, the valve member being shown in an open position;

FIG. 3 is a fragmentary cross-sectional view of the valve body, the valve seat, the valve member and the sealing assembly, taken along the central line of the valve stem;

FIG. 4 is a fragmentary cross-sectional view of the valve body, the valve seat and the valve member;

FIG. 5 is a perspective view of a valve member; and

FIG. 6 is a partly sectional front view of a butterfly valve with the valve member in its closed position.

A butterfly valve 10 according to the present invention mainly comprises a valve body 11, a valve seat 12, a valve stem 13, a valve member 14 and a sealing assembly 15 and is disposed between two tubular flange members 16, 16 and adapted to control the fluid flow by opening and closing a flowway 17.

The valve body 11 has a dovetail 21 in the inner circumferential surface thereof. Annular protrusions 22, 22 and annular grooves 23, 23 have circular section as shown in FIG. 3. Numeral 24 indicates the neck of the valve body. The valve stem 13 is located on the central line passing through the centers of the neck 24 and the valve body, and passes through the valve seat and the valve body.

The valve seat 12 is of a ring-like shape. In the outer circumferential surface of the seat, there is provided a dovetail groove 27 which corresponds to the dovetail 21 in the valve body 11. The valve seat 12 fits with the inner circumferential surface of the valve body 11. The valve body 11 is formed of metal, while the valve seat 12 is of synthetic rubber or plastics having excellent wear-resisting property, elasticity and durability. The valve seat 12 has a larger width (dimension in the direction of fluid flowing) than that of the valve body 11 and slightly protrudes beyond the latter, so that when the butterfly valve is inserted between the tubular flange members 16, 16 and bolted, the seat 12 is urged inwardly by the distance corresponding to the said protrusion by means of tubular flange members 16, 16. Therefore, two sides 28, 28 of the valve seat 12 and tubular flange members are brought in close contact with each other by the resiliency of the synthetic rubber or plastics. Thereby a seal between the butterfly valve and the tubular flange members is achieved without use of a gasket for piping.

The annular protrusions 29, 29 defining dovetail groove in the outer circumferential surface of the valve seat 12 engage with the groove 23 of the valve body 11. The opposite faces of the protrusions 29, 29 have a round shape and outwardly tapered faces 29b, 29b are formed from the portions 29a, 29a of the largest diameter. Namely, the outer surfaces 29b, 29b of the protrusions 29, 29 are tapered ones with the larger diameter at the side of opposing faces and the smaller at the sides 28, 28. The angle θ of inclination of the tapered surfaces (see FIG. 4) is most preferably 15°–20° but may be of another valve. Of course, the inner circumferential surface of the valve body 11 is a tapered surface in continuation with each of the grooves 23, 23 so as to engage with the tapered surfaces 29b, 29b of the valve seat. According to the present invention, due to the presence of the tapered surface 29b, 29b the valve body 11 has a shape as covering the valve seat 12. Accordingly, when the valve body is disposed between the tubular flange members, the valve seat is prevented from protruding beyond the side of the valve body. Further, since the protrusions 22, 22, 29, 29 have a round shape, the valve body well fits and engages with the valve seat to prevent disengagement, and the valve seat can be rigidly held from the time of manufacture through the life thereof.

FIG. 3 is a sectional view taken along the valve stem 13 passing through the valve body 11 and the valve seat 12 and there is illustrated a sealing assembly 15. The sealing assembly 15 comprises an O-ring 31 fitted onto the valve stem 13 and a ring-shaped holder 34 supporting the O-ring 31 and fixedly fitted into an annular groove 33 provided in the inner circumferential surface.

The diameter of the inner circumference of the horizontal portion 34a of the holder 34 is larger than that of the valve stem 13 and the inner diameter of the vertical portion 34b is one that centripetally urges the O-ring fitted on the valve stem from outside against the stem. The O-ring 31 is closely fitted onto the valve stem and urged thereagainst by means of the holder 34. The reaction force of this urging action is applied on the inner circumferential surface of the vertical portion 34b of the holder, so that the seal between the valve seat 12 and the valve stem 13 is perfectly achieved and the fluid leakage is effectively prevented with such a simple arrangement. If the seal between valve member 14 and the valve seat 12 is regarded as the first seal, the abovementioned seal is the second one and contributes to further preventing the fluid leakage to the ground side of the valve.

The valve stem 13 passes through the valve seat 12 at two points, two sealing assemblies 15, 15 are provided on the butterfly valve 10 as apparently shown in FIG. 1. Each of the sealing assemblies may be located near the outer circumferential surface of the valve seat or at a further inner portion thereof. The holder 34 is preferably formed of alminium alloy or stainless steel. The holder 34 is fixedly embedded in the valve seat at the nearest position to a possible leakage source.

The valve member 14 has a disk like outer shape as shown in FIGS. 5 and 6, and provided with a cylindrical portion 37 through which the valve stem 13 extends. The valve member is so formed that it becomes thinner toward its periphery and the peripheral edge is of a convergent form as shown in FIG. 4. This peripheral edge 38 is formed convergent by bevelling the same from either side. Alternatively, the valve member may be molded using a mold adapted to form the peripheral edge 38 in a convergent form with a round top portion.

At the ends of the cylindrical portion of the valve member 14 intersecting with the peripheral edge 38, there are provided flat portions 39, 39 perpendicular to the valve stem 13, respectively.

Parts of the peripheral edge 38 near each of the ends of the cylindrical portion 37 are formed in planes 40 extending from the flat portions 39, 39. Due to the formation of these planes 40, other parts of the peripheral edge can be bevelled in a convergent form without damaging the flat portion 39, 39. The flat portions 39, 39 are adapted to closely contact with a flat portion 41 of the valve seat so that fluid is sealed against the leakage from between the valve member and the valve seat even if the valve member is rotated. When a notch or the like by bevelling is formed on the flat portions 39, 39, the fluid is apt to leak through the notch. According to the present invention, by providing the flat portions 39, 39 and the extended plane 40, the seal between the valve seat 12 and the valve member 14 is achieved.

The valve member 14 is fixed on the valve stem 13 by fixing means 35, 35, each of which means 35 comprises a tapered bolt, a nut and a spring washer.

The inner circumferential surface of the valve seat 12 defines a seat face for the valve member. The whole inner circumference (except for the flat portions 41, 41 adapted to contact with the two flat portions 39, 39 of the valve member) has such a section as shown in FIG. 4. As apparent from FIG. 4, the inner circumference of the valve seat is not of a uniform diameter in the direction of the width (direction of fluid flow), but the central portion is raised and thus has a smaller diameter than the two side portions. The central raised portion 42 has a convexed section in smooth continuation with the cylindrical portions 43, 43 located on both sides. Each corner portion of the cylindrical portions 43, 43 and the sides 28, 28 are formed to have a round shape.

The diameter at the highest point of the central raised portion is smaller than the diameter of the valve member 14, and the valve member 14 is closed so as to urge the highest portion of the central raised portion in the radial direction. When the valve member is in the closed position, the central raised portion 42 is resiliently urging the peripheral edge of the valve member whereby fluid can be perfectly prevented from flowing. And the valve seat is deformed at the boundaries between the central raised portion and the cylindrical portions. Therefore, any deformation is not produced in the valve seat which prevents sealing between the valve seat and other members.

The flat portion 41 of the valve seat 12 has a larger thickness than other portions. Usually, if the portion through which the valve stem passes has a large thickness, only an imperfect seal will be provided between the valve seat and the valve stem. However, according to the present invention, since sealing assemblies 15, 15 are embedded in the portion of large thickness of the valve seat 12 as abovementioned, the thickness of the valve seat is regulated, thus ensuring a perfect seal.

The valve stem 13 is rotatably supported by the valve body 11 and the valve seat 12. One end of the valve stem is projecting outwardly from the valve body 11 and provided with a key or formed in a square pillar so that the valve stem can be rotated by means of a handle (not shown) or the like.

The butterfly valve 10 of such a construction as abovementioned is fixed on the tubular flange members 16, 16 by means of a plurality of bolts 45. Fixing of the butterfly valve can be achieved only by holding the same by means of tubular flange members, but then the valve is apt to slip in the direction of the circumference. According to the present invention, four fitting portions 47 having a bolt bore 46 respectively are provided on the valve body 11 and at the same time a plurality of recesses 48 in which bolts can be fitted are formed in the peripheral surface of the valve body 11. In case of using a butterfly valve 10 as shown in FIGS. 2 and 6, the tubular flange members 16, 16 are fixed by means of 12 bolts. The number of bolts is not limited to twelve, of course, and the valve can be fitted not only by means of tubular flange members but it may be fixed directly onto other devices.

What is claimed is:

1. A butterfly valve having an axially extending flow passage comprising:
   a. a tubular valve body having a flat inner circumferential surface and a pair of radially extending end faces extending transversely to the flow axis,
   b. an annular valve seat of resilient material having an outer circumferential surface engaging the inner circumferential surface of the valve body and an inner circumferential surface providing a seating surface and defining the axially extending flow passage,
   c. a valve stem extending transversely through the valve body and the valve seat and being rotatably supported therein,
   d. a valve disc supported by the valve stem inside the valve seat and having a peripheral edge engageable with the seating surface of the valve seat,
   e. sealing means positioned in the valve seat around the valve stem for providing a seal between the valve stem and the valve seat,
   the improvement characterized by the valve body having a groove adjacent the juncture of each of the end faces and the flat inner circumferential surface of the valve body, each of the grooves extending radially outwardly from the inner surface and axially inwardly from the end face to provide the valve body with a radially inwardly extending dovetail projection which terminates in said flat inner circumerential surface and a pair of arcuate end edges, each of said grooves having a radially outwardly and axially inwardly extending first arcuate surface which extends from one of the edges of the dovetail projection, a radially outwardly and axially outwardly extending second arcuate surface which extends from said first arcuate surface and a radially inwardly and axially outwardly extending flat surface which extends from said second arcuate surface to one of the end faces of the valve body, the outer circumferential surface of the valve seat having a flat central portion which engages the flat inner surface of the dovetail projection of the valve body, a pair of projections which are shaped complementarily to the arcuate end edges of the dovetail projection and the annular grooves in the valve body and which are received in the annular grooves whereby the maximum transverse dimension of each of the projections is spaced axially inwardly from the adjacent end face of the valve body, each of the projections of the valve seat terminating in a radially extending end face which is positioned axially outwardly and radially inwardly of the adjacent end face of the valve body, said flat surface of each of said grooves in said valve body extending at an angle of about 15° to 20° to the axis of the valve body.

2. The butterfly valve of claim 1 in which the sealing means comprises a pair of O-rings through which the ends of the valve stem extend and a pair of annular O-ring holders, each O-ring holder being generally channel-shaped in transverse cross section, each O-ring being snugly received within one of the O-ring holders and being pressed against the valve stem by the holder, each of the O-ring holders being positioned in a recess in the valve seat.

* * * * *